(12) United States Patent
Matsuzaki

(10) Patent No.: US 10,353,133 B2
(45) Date of Patent: Jul. 16, 2019

(54) ILLUMINATION DEVICE

(71) Applicant: PANASONIC INTELLECTUAL PROPERTY MANAGEMENT CO., LTD., Osaka (JP)

(72) Inventor: Jumpei Matsuzaki, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/123,458

(22) Filed: Sep. 6, 2018

(65) Prior Publication Data

US 2019/0072707 A1    Mar. 7, 2019

(30) Foreign Application Priority Data

Sep. 7, 2017 (JP) ................................. 2017-172079

(51) Int. Cl.
 *F21V 8/00* (2006.01)
(52) U.S. Cl.
 CPC ......... *G02B 6/0061* (2013.01); *G02B 6/0043* (2013.01); *G02B 6/0068* (2013.01); *G02B 6/0085* (2013.01)
(58) Field of Classification Search
 CPC .. G02B 6/0061; G02B 6/0043; G02B 6/0068; G02B 6/0085
 See application file for complete search history.

(56) References Cited

U.S. PATENT DOCUMENTS

| 5,921,651 | A | * | 7/1999 | Ishikawa | G02B 6/0065 |
| | | | | | 362/23.15 |
| 6,481,882 | B1 | * | 11/2002 | Pojar | G02B 6/001 |
| | | | | | 359/598 |
| 7,306,559 | B2 | * | 12/2007 | Williams | A61B 17/02 |
| | | | | | 600/245 |
| 8,591,052 | B2 | * | 11/2013 | Wheatley | G02B 6/0035 |
| | | | | | 345/102 |
| 8,807,774 | B2 | * | 8/2014 | Wheatley | G02B 6/0035 |
| | | | | | 362/633 |
| 9,523,810 | B2 | * | 12/2016 | Nakagome | G02B 6/0036 |
| 2004/0179777 | A1 | * | 9/2004 | Buelow, II | G02B 6/001 |
| | | | | | 385/31 |

FOREIGN PATENT DOCUMENTS

JP     2013-125685     6/2013

* cited by examiner

*Primary Examiner* — Karabi Guharay
*Assistant Examiner* — Glenn D Zimmerman
(74) *Attorney, Agent, or Firm* — Greenblum & Bernstein, P.L.C.

(57) ABSTRACT

An illumination device is provided that provides a uniform luminance of a light emitting surface and is less likely to cause a fringe pattern. The illumination device includes a mounting substrate on which multiple LEDs are mounted, a planar light guide plate that receives and guides at least a part of emission light emitted from the multiple LEDs, and multiple optical structures that are provided at intervals on one surface of the light guide plate and that change a traveling direction of light. The multiple optical structures include a first arrangement section that is provided on the LED side, a second arrangement section that is provided on a side away from the LEDs, and a third arrangement section that is provided between the first arrangement section and the second arrangement section.

8 Claims, 7 Drawing Sheets

DISTANCE, IN OPTICAL AXIS DIRECTION, FROM LEDS

| | REFERENCE EXAMPLE 1 | REFERENCE EXAMPLE 2 | REFERENCE EXAMPLE 3 | EXAMPLE |
|---|---|---|---|---|
| INTERVAL BETWEEN OPTICAL STRUCTURES | Xend, Xstart (linear) | (linear down) | (S-curve) | (two-stage curve) |
| COVERING RATE | Send, Sstart (concave) | (linear down) | (S-curve) | (S-curve) |
| LATERAL FRINGE | EXCELLENT | POOR | EXCELLENT | GOOD |
| LOW COVERING RATE REGION FRINGE PATTERN | EXCELLENT | POOR | POOR: FRINGE LEVEL IS HIGH AT CURVED PORTION | EXCELLENT |
| LUMINANCE UNIFORMITY | EXCELLENT | GOOD | GOOD AT LIGHT EMISSION TIME POOR AT NON-LIGHT EMISSION TIME | GOOD AT LIGHT EMISSION TIME GOOD AT NON-LIGHT EMISSION TIME |
| DOWNLIGHT LUMINANCE | POOR (62-75% TO COVERING RATE OF 40%) | GOOD | EXCELLENT | EXCELLENT (92-94% TO COVERING RATE OF 40%) |
| LIGHT DISTRIBUTION (Sim) | (polar plot) | | | (polar plot) |

FIG. 4

ILLUMINATION DEVICE

CROSS REFERENCE TO RELATED APPLICATION

The entire disclosure of Japanese Patent Application No. 2017-172079 filed on Sep. 7, 2017, including the specification, claims, drawings and abstract, is incorporated herein by reference in its entirety.

TECHNICAL FIELD

The present disclosure relates to an illumination device.

BACKGROUND

JP 2013-125685 A discloses a conventional illumination device. The illumination device includes a light source and a light guide plate. The light guide plate has one surface, on which multiple dot patterns are provided. Light from the light source enters one side of the light guide plate, travels through the light guide plate, and reaches the other side of the light guide plate. During this process, parts of the light are reflected by the dot patterns and exit from an opposite surface (a light emitting surface), which is opposite to the one surface mentioned above, to the outside. An area on the opposite surface side is illuminated with the exiting light. Further, JP 2013-125685 A indicates that, in order to obtain uniformity of the luminance of the light emitting surface, the density of the dot patterns provided on the one surface is changed according to the distance from the light source.

SUMMARY

Technical Problem

When the density of the dot patterns provided on the one surface is varied on the basis of the distance from the optical source in order to obtain uniformity of the luminance of the light emitting surface, a fringe pattern may occur in a region having a particular density.

Therefore, it is an advantage of the present disclosure to provide an illumination device in which the luminance of a light emitting surface can be made uniform and a fringe pattern is less likely to occur.

Solution to Problem

In order to achieve the aforementioned advantage, an illumination device according to the present disclosure includes:

a mounting substrate on which multiple light emitting elements are mounted;

a light guide plate that receives and guides at least a part of emission light emitted from the multiple light emitting elements and at least a part of which has a plate-like portion; and multiple optical structures that are provided at intervals on at least a part of one surface of the plate-like portion and which change a traveling direction of light, wherein the multiple optical structures include a first arrangement section that is provided on the light emitting element side and in which an interval between the adjacent optical structures decreases in an arithmetic series manner with increase in a distance from the light emitting elements, a second arrangement section that is provided on a side away from the light emitting elements and in which the interval between the optical structures that are adjacent to each other in a separating direction is fixed, the separating direction being a direction away from the light emitting elements, and a third arrangement section that is provided between the first arrangement section and the second arrangement section with respect to the separating direction and in which the interval between the adjacent optical structures is smaller than a minimum interval between the adjacent optical structures in the first arrangement section, is larger than the interval between the adjacent optical structures in the second arrangement section, and decreases with increase in the distance from the light emitting elements.

Advantageous Effects of Invention

In an illumination device according to the present disclosure, the luminance of a light emitting surface can be made uniform, and a fringe pattern is less likely to occur.

BRIEF DESCRIPTION OF DRAWINGS

The figures depict one or more implementations in accordance with the present teachings, by way of example only, not by way of limitations. In the figures, like reference numerals refer to the same or similar elements. Embodiments of the present disclosure will be described based on the following figures, wherein:

FIG. 4 shows a test result obtained by testing the occurrence likelihood of a fringe pattern, etc. in different arrangement patters of multiple optical structures, and indicates the advantages of the embodiment of the present disclosure;

DESCRIPTION OF EMBODIMENTS

Hereinafter, a detailed description is given of an embodiment according to the preset disclosure, with reference to the drawings. If the following description provides a plurality of embodiments and modifications, characteristic features thereof are expected, in the first place, to be combined with one another, as appropriate, to form a new embodiment.

Figure 1:
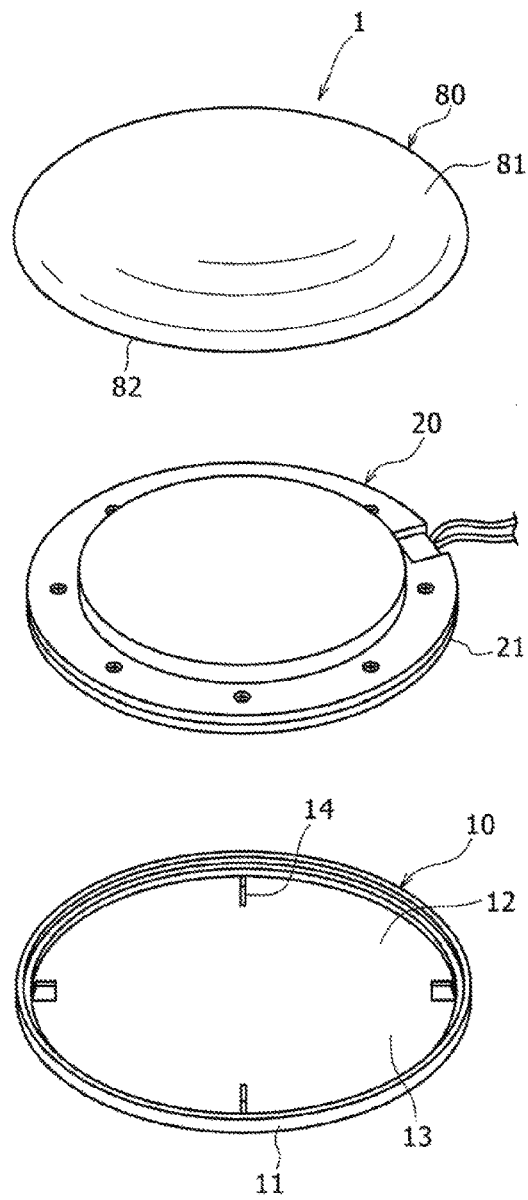
FIG. 1 is an exploded perspective view of the main part of an illumination device according to one embodiment of the present disclosure.
Figure 2:
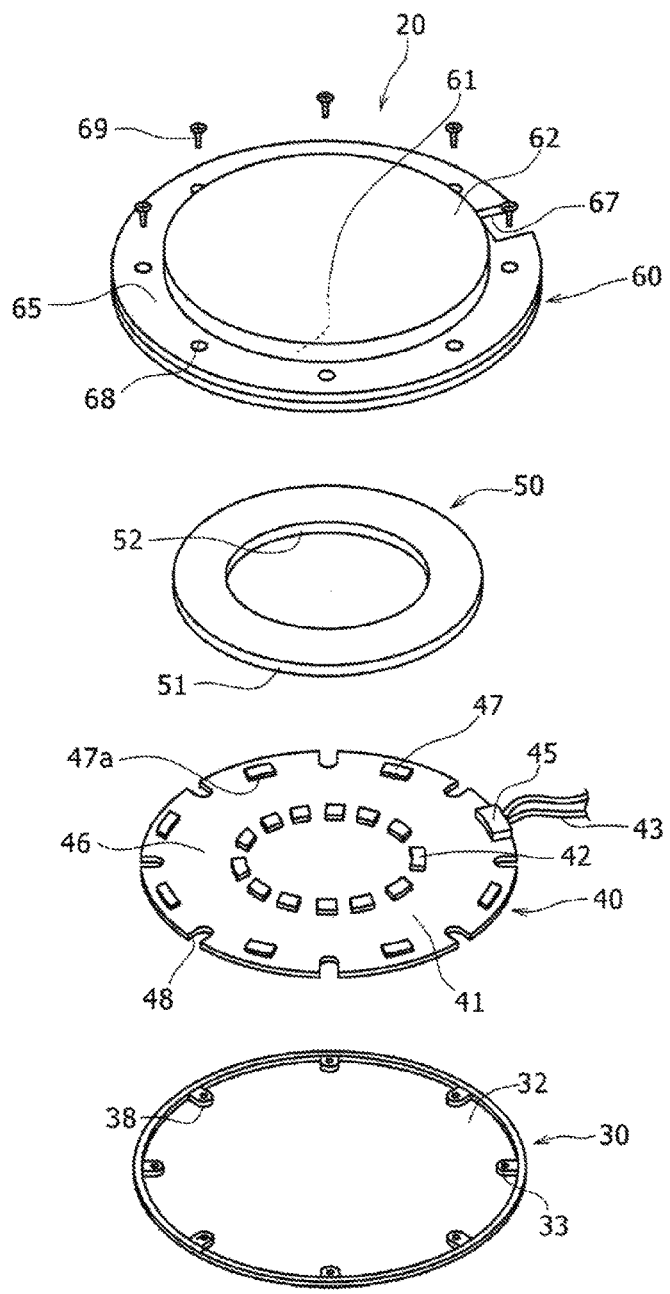
FIG. 2 is an exploded perspective view of an illumination part of the illumination device.

FIG. 1 is an exploded perspective view of the main part of an illumination device 1 according to one embodiment of the present disclosure. FIG. 2 is an exploded perspective view of an illumination part 20 of the illumination device 1. With reference to FIG. 1, the illumination device 1 has an integrated structure, and is fixed to the ceiling of a room with a known attachment structure, for example. The illumination device 1 includes an illumination housing part 10, the illumination part 20, and a lid part 80. Each of the illumination housing part 10 and the lid part 80 is formed by injection molding using a resin material such as an ABS (acrylonitrile butadiene styrene copolymer) resin.

The illumination housing part 10 includes a cylindrical side wall section 11 and a disk-like upper section 12. The side wall section 11 extends in the axial direction of the upper section 12 from the edge of the upper section 12. The upper section 12 and the side wall section 11 define an illumination part housing space having a substantially columnar shape and having an opening on the lower side thereof. The bottom surface of the upper section 12 has multiple ribs 14 extending in the radial direction. The multiple ribs 14 are disposed at a substantially equal interval in the circumferential direction. The respective distances from the ribs 14 to the center of the circular bottom surface 13 are equal to one another. The multiple ribs 14 are provided for positioning of the illumination part 20.

The illumination part 20 is formed by integrally assembling a plurality of components. The illumination part 20 has a cylindrical outer circumferential surface 21. The outer diameter of the cylindrical outer circumferential surface 21 is substantially equal to the distance from the center of the circular bottom surface 13 to each of the ribs 14. The cylindrical outer circumferential surface 21 is engaged with radially inner end surfaces of the ribs 14, so that the illumination part 20 is positioned relative to the illumination housing part 10.

The lid part 80 has a light exit surface 81 formed into a downwardly projecting surface shape. Light is generated at the illumination part 20, the direction of the generated light is changed to the lower side, and the downwardly traveling light exits through the light exit surface 81 (the detailed description of this process is given later). In the state where the illumination part 20 is positioned relative to the illumination housing part 10 with the multiple ribs 14, an edge section 82 of the lid part 80 is fitted to the inner circumferential side of the side wall section 11, so that the main part of the illumination device 1 is formed.

Next, the structure of the illumination part 20 is described in detail with reference to FIG. 2. As illustrated in FIG. 2, the illumination part 20 includes a heat dissipation plate 30, an LED substrate 40 as a mounting substrate, a light guide plate 50, and a front surface cover 60.

The heat dissipation plate 30 is provided for dissipating drive heat from light emitting diodes (hereinafter, referred to as LEDs) 42 as light emitting elements. The heat dissipation plate 30 is made from a metal material such as iron or aluminum, which has an excellent heat capacity. The heat dissipation plate 30 includes a bottom surface 32 formed into a circular flat surface. The LED substrate 40 is placed on the bottom surface 32. Multiple projections 38 are provided at intervals in the circumferential direction in the circumferential area of the bottom surface 32. The projections 38 each project from the outer circumferential side to the radially inner side. The projections 38 each have a screw hole 33 extending in the height direction.

The LED substrate 40 includes an annular substrate main body 41, the multiple LEDs 42, wiring 43, and a connector 45. The substrate main body 41 is preferably formed by use of a glass composite material, but may be formed of a flexible substrate. The substrate main body 41 has, on a front side surface 46 thereof, a wiring pattern (not illustrated) for electric connection of the multiple LEDs 42. The substrate main body 41 has multiple cutouts 48 at the circumferential edge portion thereof. The multiple cutouts 48 are fitted to the multiple projections 38 so that the substrate main body 41 is positioned relative to the heat dissipation plate 30. The rear side surface of the substrate main body 41 is placed on the bottom surface 32 of the heat dissipation plate 30 so as to be thermally bonded to the bottom surface 32. The front side surface 46 of the substrate main body 41 has multiple projections 47. Radially inner side end surfaces 47a of the multiple projections 47 are each formed of a part of a cylindrical inner circumference. The center axis of the cylindrical inner circumference matches the center axis of the annular substrate main body 41. The end surfaces 47a are disposed at positions radially inside the radially inner ends of the cutouts 48.

The LEDs 42 are mounted on the substrate main body 41, and are each formed by covering an LED chip with a sealing resin. The multiple LEDs 42 are mounted at intervals, in the circumferential direction, on the circumference of the same circle on the front side surface 46 of the substrate main body 41. The center of the circumference of the same circle matches the center of the annular substrate main body 41. Other electronic components (illustration and description of which are omitted) including a resistive element are mounted on the front side surface 46 of the substrate main body 41.

The wiring 43 is formed by covering a lead wire as a core with an insulative member. The wiring 43 is electrically connected to the wiring pattern on the substrate main body 41. The connector 45 electrically connects the LEDs 42 to the wiring 43. The connector 45 is formed by injection molding using a resin material such as PP (polypropylene) or PE (polyethylene). The connector 45 incorporates a conductive member (not illustrated). The connector 45 electrically connects the wiring 43 and the wiring pattern on the substrate main body 41 to each other through the conductive member. The wiring 43 may be electrically connected directly to the wiring pattern without the connector 45.

The light guide plate 50 is a plate-like member, and has a cylindrical shape (a hollow disk shape). The light guide plate 50 is provided for guiding light from the LEDs 42 and causing the light to efficiently exit to the outside. The light guide plate 50 is preferably formed from PC (polycarbonate) or an acrylic resin such as a PMMA (polymethyl methacrylate) resin, for example. The light guide plate 50 is disposed on the front side of the LED substrate 40 and positioned relative to the LED substrate 40 such that a cylindrical outer circumferential surface 51 of the light guide plate 50 comes into contact with the end surfaces 47a of the projections 47. In the state where the light guide plate 50 is positioned relative to the LED substrate 40, the multiple LEDs 42 are disposed radially inside a cylindrical inner circumferential surface 52 of the light guide plate 50 and radially facing the cylindrical inner circumferential surface 52. In this state, the optical axis of exit light from the LEDs 42 substantially matches the radial direction of the cylindrical inner circumferential surface 52.

Multiple optical structures (not illustrated in FIG. 2) are provided on the rear side surface, of the light guide plate 50, on the LED substrate 40 side. The multiple optical structures are provided at intervals. Each of the optical structures is formed of a dot-like projection. The optical structures reflect light having entered the light guide plate 50 from the LEDs 42 toward the front surface cover 60. Arrangement and configuration of the multiple optical structures are described in detail later.

The front surface cover 60 is provided for holding the LED substrate 40 and the light guide plate 50 stacked between the heat dissipation plate 30 and the front surface cover 60. The front surface cover 60 is formed of material having excellent permeability, such as acrylic resin. The front surface cover 60 includes a hollow disc section 65, and a light guide plate housing section 62 connected to the inner circumferential edge portion of the disc section 65. The light guide plate housing section 62 defines a columnar light guide plate housing chamber 61 that houses the light guide plate 50. The light guide plate housing chamber 61 has an opening at the light guide plate side in the height direction. The height of the light guide plate housing chamber 61 is substantially equal to the height of the light guide plate 50. The hollow disc section 65 has a cutout 67 at a position corresponding to the connector 45, and has screw holes 68 at positions corresponding, in the height direction, to the screw holes 33 and the cutouts 48.

While the LED substrate 40 and the light guide plate 50 are sandwiched between the heat dissipation plate 30 and the front surface cover 60, screws 69 are screwed into both of the screw holes 33, 68 so as to pass through the cutouts 48. As a result, the heat dissipation plate 30, the LED substrate 40, the light guide plate 50, and the front surface cover 60 are integrally assembled together.

Figure 3A:
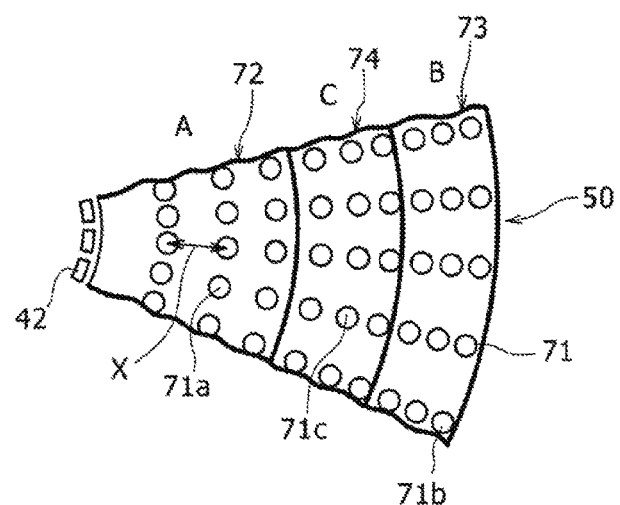
FIG. 3A is a schematic diagram regarding the structure of a light guide plate included in the illumination part, and illustrates a part of the light guide plate in the circumferential direction when viewed from the rear side.
Figure 3B:
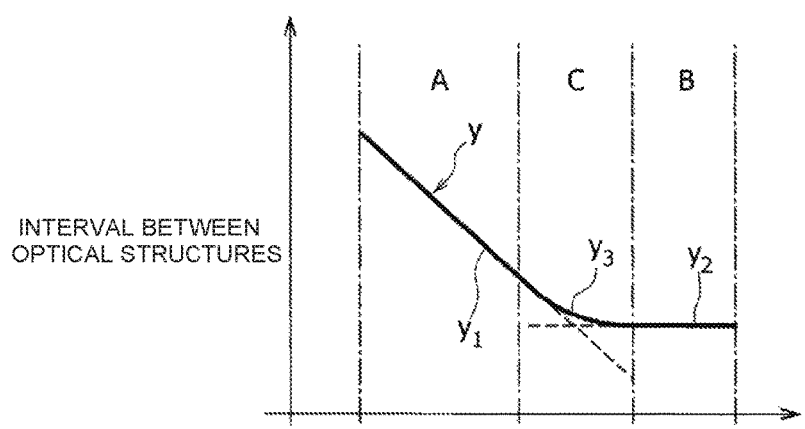
FIG. 3B is a schematic diagram regarding the structure of the light guide plate included in the illumination part, and shows the relationship between the distance, in the optical axis direction, of multiple optical structures provided on the light guide plate from light emitting diodes and the interval between the optical structures that are adjacent to each other in the optical axis direction.

FIG. 3A and FIG. 3B are schematic diagrams showing the structure of the light guide plate 50. FIG. 3A is a schematic diagram of a part of the light guide plate 50 in the circumferential direction when viewed from the rear side. FIG. 3B is a diagram showing the relationship between the distance, in the optical axis direction, of multiple optical structures 71 provided on the light guide plate 50 from the LEDs 42 and the interval between the optical structures 71 adjacent to each other in the optical axis direction. The optical structures 71 in practice each have a fine structure having a diameter of several tens to several hundreds of μm. However, in FIG. 3A, the optical structures 71 are exaggeratedly illustrated, and further, the number of the optical structures 71 illustrated is much smaller than that in practice, in order to be easily recognizable. In addition, in the embodiment shown in FIG. 3A and FIG. 3B, the optical axis direction matches a separating direction which is a direction away from the light emitting elements (the LEDs 42).

As illustrated in FIG. 3A, the multiple optical structures 71 include a first arrangement section 72, a second arrangement section 73, and a third arrangement section 74. The first arrangement section 72 is formed of multiple optical structures 71a that are arranged in a first region A on the radially inner side (the radially LED 42 side) on the light guide plate 50. The second arrangement section 73 is formed of multiple optical structures 71b that are arranged in a second region B on the radially outer side on the light guide plate 50. The third arrangement section 74 is formed of multiple optical structures 71c that are arranged in a third region C located, in the optical axis direction (the radial direction), between the first region A and the second region B.

As shown in FIG. 3B, in the multiple optical structures 71a in the first region A, the interval between the optical structures 71a adjacent to each other in the optical axis direction decreases in an arithmetic series manner with increase of the distance, in the optical axis direction, from the LEDs 42. In the multiple optical structures 71b in the second region B, the interval between the multiple optical structures 71b adjacent to each other in the optical axis direction is fixed irrespective of the distance, in the optical axis direction, from the LEDs 42. In the multiple optical structures 71c in the third region C, the interval between the optical structures 71c that are adjacent to each other in the optical axis direction is smaller than the minimum interval between the optical structures 71a that are adjacent to each other in the optical axis direction in the first arrangement section 72, and is larger than the interval between the optical structures 71b that are adjacent to each other in the optical axis direction in the second arrangement section 73. In the multiple optical structures 71c in the third region C, the interval between the optical structures 71c that are adjacent to each other in the optical axis direction decreases with increase of the distance, in the optical axis direction, from the LEDs 42.

A two-dimensional plane is considered in which the distance, in the optical axis direction, from the LEDs 42 is used as one parameter and the interval between the optical structures 71 that are adjacent to each other in the optical axis direction is used as the other parameter. The distances, in the optical axis direction, of the multiple optical structures 71 from the LEDs 42 and the intervals between the optical structures 71 that are adjacent to each other in the optical axis direction are plotted on the two-dimensional plane. Here, as shown in FIG. 3B, multiple dots plotted on the two-dimensional plane are disposed on a smooth line y which is differentiable. Among the multiple plotted dots, dots related to the optical structures 71c in the third region C are disposed on the same clothoid curve y3. The smooth line y is formed, so as to be differentiable, by connecting together a straight line y1 that decreases with increase of the distance, in the optical axis direction, from the LEDs 42, the clothoid curve y3, and a straight line y2 on which the interval between the optical structures is fixed.

FIG. 4 shows a test result obtained by testing the occurrence likelihood of a fringe pattern, etc. in different arrangement patterns of the multiple optical structures, and indicates the advantages of an example of the present disclosure. As the illumination device of the example in FIG. 4, the illumination device described with reference to FIGS. 1 to 3B was used. Illumination devices of reference examples 1 to 3 were different from the illumination device of the example only in arrangement of the multiple optical structures provided on the light guide plate. In each of the illumination devices of the example and reference examples 1 to 3, the optical axis direction matched the separating direction which is a direction away from the light emitting elements.

As shown in FIG. 4, in the illumination device of reference example 1, with increase of the distance, in the optical axis direction, from LEDs, the interval between the optical structures that are adjacent to each other in the optical axis direction decreases in a linear function manner (linearly). In the illumination device of reference example 2, with increase of the distance, in the optical axis direction, from the LEDs, the interval between the optical structures that are adjacent to each other in the optical axis direction decreases along a curved line projecting toward an X-axis side, which represents the distance from the LEDs.

In the illumination device of reference example 3, with increase of the distance, in the optical axis direction, from the LEDs, the interval between the optical structures that are adjacent to each other in the optical axis direction is first kept fixed, abruptly decreases, and is then kept fixed. The line representing the interval between the optical structures in the illumination device of reference example 3 is a smooth line which is differentiable in all the regions. The smooth line has an inflection point in a region where the interval between the optical structures abruptly decreases. On the other hand, in the example, the multiple optical structures are arranged on the light guide plate at the interval described with reference to FIG. 3A and FIG. 3B.

Figure 5A:
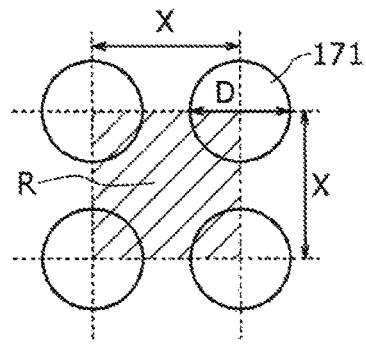
FIG. 5A is a diagram regarding the definition of a covering rate.

Next, a covering rate, which is one of the items in FIG. 4, will be described with reference with FIGS. 5A, 5B, and 5C. Optical structures 171 formed of multiple dot regions having the same hemispherical shape are assumed to be arranged in a matrix in which the column interval and the row interval therebetween are the same on one surface of a light guide plate, as illustrated in FIG. 5A. In this case, one optical structure 171 is housed in one matrix region R which is shown hatched in the drawing. Thus, the covering rate S of the optical structures 171 is expressed by $S=(\pi(D/2)^2)/X^2=\pi D^2/(4X^2)$ when the diameter of each of the optical structures 171 is defined as D and the columnar interval (the row interval) is defined as X. As indicated by this example, the covering rate S is defined as the ratio of the region where optical structures are present to a surface on which the optical structures are arranged in a plan view.

Figure 5B:
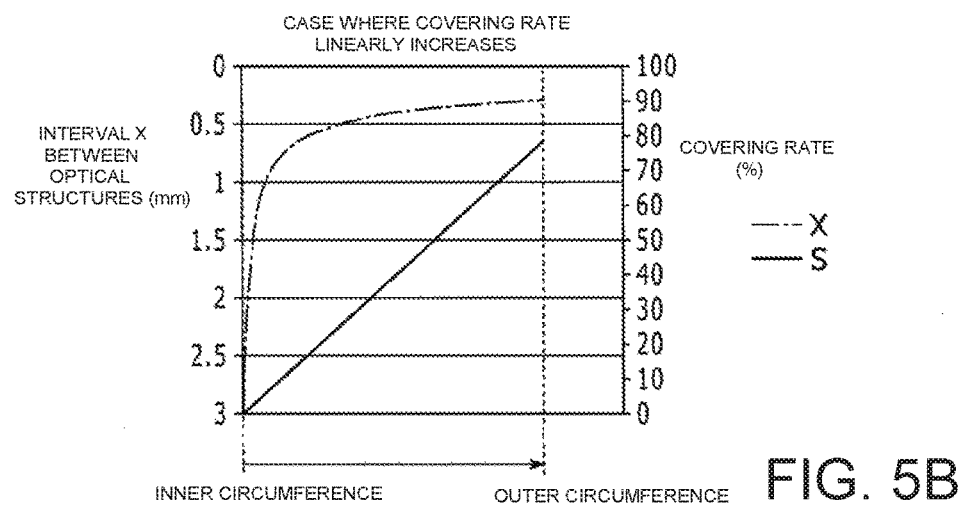
FIG. 5B is a diagram regarding the relationship between a covering rate and the interval between optical structures.

As shown in FIG. 5B, the covering rate S is assumed to linearly increase from the inner circumferential side to the outer circumferential side with increase of the distance, in the optical axis direction, from the LEDs. In this case, the interval between the optical structures that are adjacent to each other in the optical axis direction decreases abruptly, on the inner circumferential side, substantially along the Y axis at even a slight distance from the LEDs, and then gradually decreases by a small change amount with increase of the distance from the LEDs toward a direction parallel with the X axis.

Figure 5C:
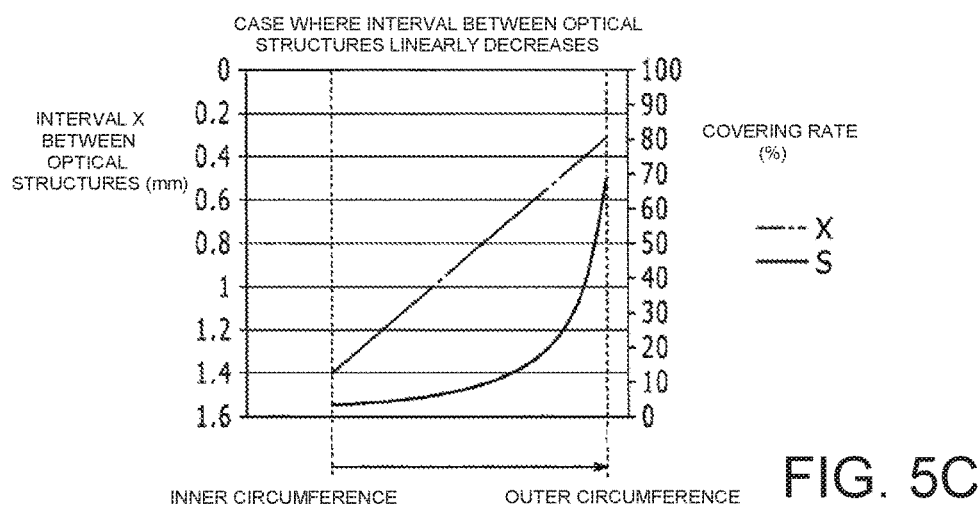
FIG. 5C is a diagram regarding the relationship between the covering rate and the interval between optical structures.

As shown in FIG. 5C, the interval between the optical structures that are adjacent to each other in the optical axis direction is assumed to decrease linearly from the inner circumferential side to the outer circumferential side with increase in the distance, in the optical axis direction, from the LEDs. In this case, the covering rate S gradually increases by a small change amount on the inner circumferential side with the increase in the distance, in the optical axis direction, from the LEDs, and then increases abruptly toward a direction parallel with the Y axis.

With reference back to FIG. 4, reference example 1 corresponds to FIG. 5C and reference example 2 corresponds to FIG. 5B. Consequently, in reference example 1, the covering rate gradually increases, on the inner circumferential side, by a small change amount with increase in the distance, in the optical axis direction, from the LEDs, and then, abruptly increases toward a direction parallel with the Y axis. In reference example 2, the covering rate increases in a linear function manner with increase in the distance, in the optical axis direction, from the LEDs.

In reference example 3, the covering rate is at a fixed value on the inner circumferential side, abruptly increases, and then becomes a fixed value on the outer circumferential side. On the other hand, in the example, the covering rate gradually increases at a gradually increasing change rate on the inner circumferential side. Then, the covering rate significantly increases, and then, gradually increases with a gradually decreasing change rate on the outer circumferential side. In the example, the curved line representing the covering rate has an inflection point in an intermediate region (a region corresponding to the third region C in FIG. 3A and FIG. 3B) where the covering rate increases significantly.

Lateral fringes, low covering rate region fringe patterns, luminance uniformities, and downlight illuminances obtained in the aforementioned illumination devices of reference examples 1 to 3 and the example are shown in FIG. 4. A lateral fringe means a fringe pattern of a fringe extending in a direction orthogonal to the height direction of an illumination device. A low covering rate region fringe pattern is a fringe pattern in a region of light reflected by the optical structures on the inner circumferential side of the light guide plate. A luminance uniformity is a degree of uniformity of luminance independent of the distance from LEDs. A downlight illuminance is the illuminance of light emitted directly downward from an illumination device.

Figure 6:
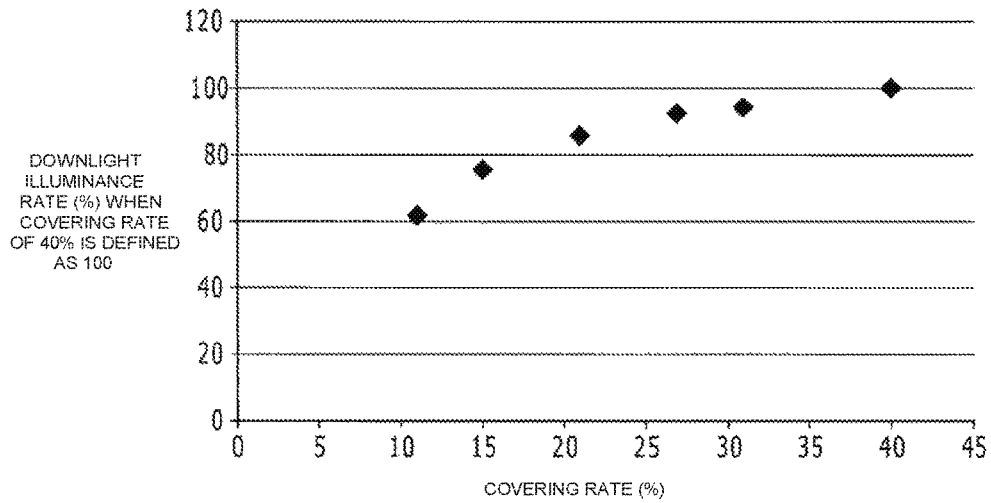
FIG. 6 is a diagram showing the relationship between the covering rate and a downlight illuminance.

In the illumination device of reference example 1, no lateral fringe and no low covering rate region fringe pattern were found, and the illuminance uniformity was excellent. However, the downlight illuminance of the illumination device of reference example 1 was low. As shown in FIG. 6 which shows the relationship between the covering rate and the downlight illuminance, the downlight illuminance is reduced with decrease in the covering rate. The reason for this is that when the number of the optical structures is small, light emitted from the LEDs is less likely to be downwardly reflected. With reference to the covering rates in FIG. 4, the covering rate of the illumination device of reference example 1 was low, compared with reference examples 2 and 3 and the example. As a result, the downlight illuminance of the illumination device of reference example 1 was low.

Figure 7:
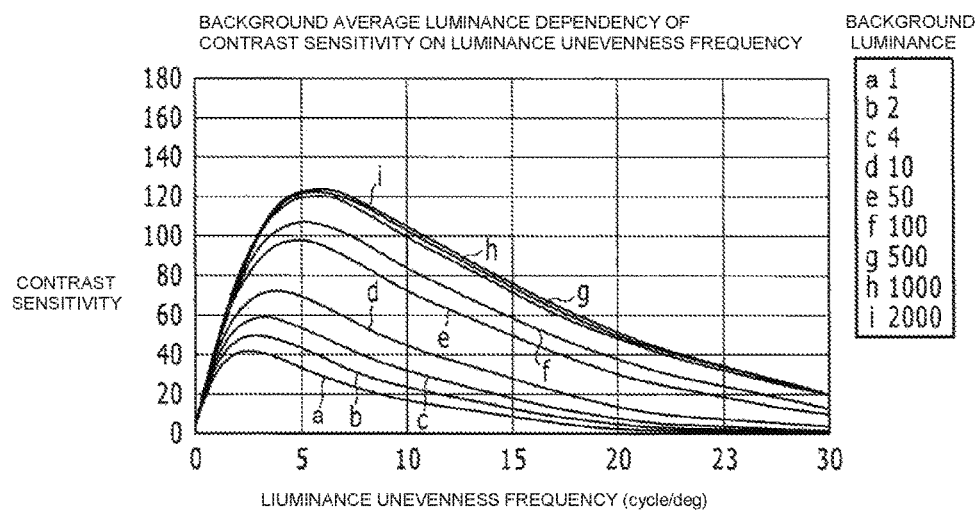
FIG. 7 is a diagram showing the relationship between a luminance unevenness frequency and a contrast sensitivity.

In the illumination device of reference example 2, the luminance uniformity and the downlight illuminance were good. However, a lateral fringe and a low covering rate region fringe pattern were found. A possible reason for that is as follows. That is, as shown in FIG. 7 which shows the relationship between the luminance unevenness frequency and the contrast sensitivity, the contrast luminance (the degree of visuality of luminance unevenness) becomes high and varies greatly in a region where the luminance unevenness frequency (a spatial frequency) is low.

The spatial frequency is an index indicating the degree of fineness of fringes, and indicates the number of fringes per unit length (the visual angle is 1 degree). When the interval between fringes is defined as w degrees, the frequency u is expressed as u=1/w. In order to obtain excellent illuminance uniformity in a region close to the LEDs, the interval between the optical structures that are adjacent to each other in the optical axis direction needs to be made large to reduce the reflection rate. Accordingly, the interval between the optical structures is large and the interval between fringes is large in the region close to the LEDs, so that the luminance unevenness frequency becomes low. Due to this, the contrast luminance becomes high and changes greatly. Consequently, when the number of optical structures in this region is large, significant change in the contrast luminance is likely to occur, the visuality of the luminance unevenness is increased, and further, the contrast luminance difference becomes large due to the interval between the optical structures, which changes according to the viewing direction, so that an unpleasant fringe pattern easily occurs. In reference example 2, since the interval between the optical structures was decreased greatly in the region close to the LEDs, the number of the optical structures in the region close to the LEDs was large. Therefore, in the illumination device of reference example 2, a lateral fringe and a low-covering-rate region fringe pattern easily occurred.

In the illumination device of reference example 3, no lateral fringe was found and the downlight illuminance was excellent. In addition, the luminance uniformity at the time of light emission of the LEDs was good. However, a low covering rate region fringe pattern was found in a region where the interval between the optical structures was suddenly decreased. Thus, the luminance of light from the illumination device when the LEDs did not emit light varied according to the distance from the LEDs.

On the other hand, in the illumination device of the example, no fringe pattern was found in the low covering rate region and few lateral fringes were found. Almost no variation in the luminance according to the distance from the LEDs was found, so that the illumination device was confirmed to have excellent downlight illuminance.

A light distribution (Sim) is an angle distribution of emission light intensities in an illumination device, wherein the angle of 0 degree represents the emission light intensity of downward light, the angle of 180 degrees represents the emission light intensity of upward light, and the angles of 90 degrees and −90 degrees each represent the emission light intensity of light travelling toward a lateral side (in the horizontal direction). As shown in FIG. 4, in the illumination device of the example, the emission light intensity of downward light was much higher and the emission light intensity of upward light was lower, compared with those in the illumination device of reference example 1. Therefore, the illumination device of the example was bright and had excellent practicability.

As described above, the illumination device 1 includes the LED substrate 40 on which the multiple LEDs 42 are mounted, and the light guide plate 50 which receives and guides at least a part of emission light emitted from the multiple LEDs 42. At least a part of the light guide plate 50 has a plate-like portion. The illumination device 1 includes the multiple optical structures 71 which are provided at intervals on at least a part of one surface of the plate-like portion so as to change the traveling direction of light. The multiple optical structures 71 include the first arrangement section 72 which is provided on the LED 42 side and in which the interval between the adjacent optical structures 71 decreases in an arithmetic series manner with increase in the distance, in the optical axis direction of the LEDs 42 (which matches the separating direction which is a direction away from the LEDs 42), from the LEDs 42. Further, the multiple optical structures 71 include the second arrangement section 73 which is provided on the side away from the LEDs 42 and in which the interval between the optical structures 71 that are adjacent to each other in the optical axis direction is fixed. Moreover, the multiple optical structures 71 include the third arrangement section 74 which is provided between the first arrangement section 72 and the second arrangement section 73 with respect to the optical axis direction. The interval between the optical structures 71 that are adjacent to each other in the optical axis direction in the third arrangement section 74 is smaller than the minimum interval between the optical structures 71 that are adjacent to each other in the optical axis direction in the first arrangement section 72, and is larger than the interval between the optical structures 71 that are adjacent to each other in the optical axis direction in the second arrangement section 73. In the third arrangement section 74, the interval between the optical structures 71 that are adjacent to each other in the optical axis direction decreases with increase in the distance from the LEDs 42.

According to the illumination device 1, in the first arrangement section 72 being close to the LEDs 42 and having high contrast sensitivity, the interval between the adjacent optical structures 71 decreases in an arithmetic series manner with increase in the distance from the LEDs 42. Accordingly, the number of the optical structures 71 in the first arrangement section 72 can be suppressed. As a result, luminance unevenness or fringe patterns are unlikely to occur. Further, since the interval between the adjacent optical structures 71 decreases in an arithmetic series manner with increase in the distance from the LEDs 42, the density of the optical structures 71 decreases with increase in the distance from the LEDs 42, so that excellent luminance uniformity can be obtained. In the second arrangement section 73 being apart from the LEDs 42 and having low contrast sensitivity, since the interval between the adjacent optical structures 71 is fixed, the covering rate in the second arrangement section 73 can be made high. As a result, the downlight illuminance can be made high while the luminance unevenness is suppressed. Moreover, the interval between the optical structures 71c in the third arrangement section 74 gradually decreases with increase in the distance from the LEDs 42. A shortest interval between the optical structures 71a in the first arrangement section 72 is longer than a longest interval between the optical structures 71c in the third arrangement section 74. Further, a shortest interval between the optical structures 71c in the third arrangement section 74 is longer than the interval between the optical structures 71b in the second arrangement section 73. Consequently, also in the third arrangement section 74 which connects the first arrangement section 72 and the second arrangement section 73 to each other, the luminance unevenness can be suppressed.

Further, a two-dimensional plane is considered in which the distance, in the optical axis direction, from the LEDs 42 is used as one parameter and the interval between the optical structures 71 that are adjacent to each other in the optical axis direction is used as the other parameter. It is assumed that the distances, in the optical axis direction, of the multiple optical structures 71 from the LEDs 42 and the intervals, at the distances, between the optical structures 71 that are adjacent to each other in the optical axis are plotted on the two-dimensional plane. Here, multiple points plotted on the two-dimensional plane may be able to be disposed on a smooth line which is differentiable and which decreases with increase in the distance from the LEDs 42.

With the present configuration, since the line indicating the interval between the adjacent optical structures 71 is differentiable in the connection region of the first arrangement section 72 and the second arrangement section 73, the connection region includes no singular point which is non-differentiable, so that occurrence of a bright line caused by such a singular point can be prevented. Consequently, illumination with more pleasing light can be realized.

Regarding the multiple optical structures 71c belonging to the third arrangement section 74, it is assumed that the distances, in the optical axis direction, from the LEDs 42 and the intervals, at the distances, between the optical structures 71c that are adjacent to each other in the optical axis direction, are plotted on the two-dimensional plane. Here, the multiple points plotted on the two-dimensional plane may be positioned on the same clothoid curve.

With the present configuration, the line indicating the interval between the adjacent optical structures 71 can be made differentiable in the third arrangement section 74 and the connection region of the first and second arrangement sections 72, 73, and can be easily decreased with increase in the distance from the LEDs 42 in the third arrangement section 74.

Each of the multiple optical structures 71 may have the same circular edge. A two-dimensional plane may be considered in which, when the covering rate is defined as the ratio of the region in which the optical structures 71 are present to the surface on which the optical structures 71 are arranged in a plan view, the distance, in the optical axis direction, from the LEDs is used as one parameter and the covering rate is used as the other parameter. The intervals between the optical structures 71 that are adjacent to each other in the optical axis direction, among the multiple optical structures 71, and the covering rates at distances from the LEDs 42 in the optical axis direction, may be plotted on the two-dimensional plane. Multiple points plotted on the two-dimensional plane may be able to be disposed on a smooth line which is differentiable and on which the covering rate increases with increase in the distance. The smooth line may have an inflection point in a region corresponding to the third arrangement section 74.

With the aforementioned configuration, on the two-dimensional plane in which the distance, in the optical axis direction, from the LEDs is used as one parameter and the covering rate is used as the other parameter, the line indicating the covering rate increases smoothly and has an inflection point in the third arrangement section 74. Accordingly, the sign of the curvature of the curved line indicating the covering rate can be changed in the third arrangement section 74, and the bent direction of the curved line can be changed in the third arrangement section 74. Accordingly, the line indicating the covering rate in the first arrangement section 72 can be naturally and smoothly connected, in the third arrangement section 74, to the line indicating the covering rate in the second arrangement section 73, so that occurrence of a bright light and occurrence of a fringe pattern can be suppressed more effectively in the third arrangement section 74.

The light guide plate 50 may have a cylindrical shape. The multiple LEDs 42 may be arranged in one or more rows in the axis direction of the light guide plate 50. Two or more of the LEDs 42 arranged in the same row may be arranged at an interval in the circumferential direction of the light guide plate 50 while the optical axes of the two or more LEDs 42 each match the radial direction of the light guide plate 50.

With the aforementioned configuration, the technical concept of the present disclosure can be easily realized in an illumination device having a disc shape.

Note that the present disclosure is not limited to the aforementioned embodiment or modifications thereof, and various improvement or modifications thereof can be made within the scope of the claims of the present application or a scope equivalent thereto.

Figure 8:
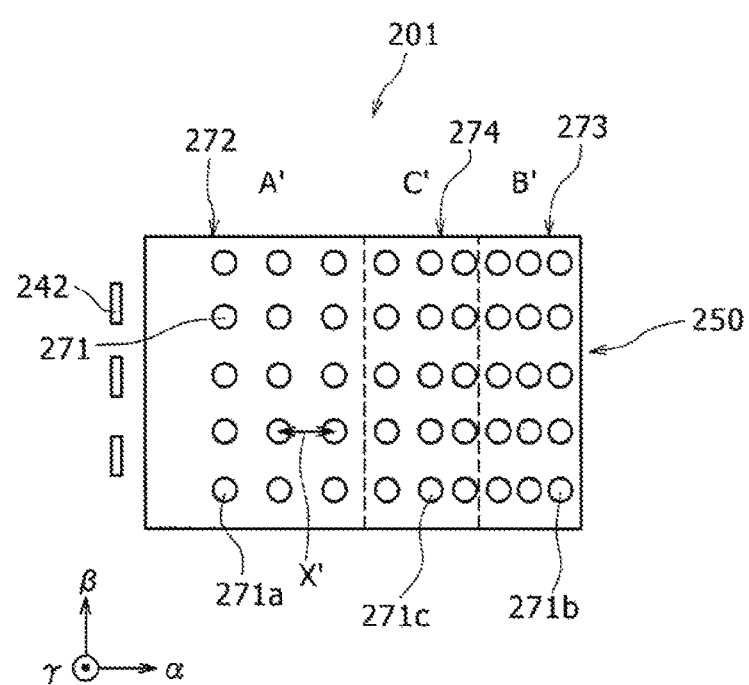
FIG. 8 is a schematic diagram of a light guide plate of an illumination device of a modification.

As one example, the case where the illumination device 1 has the light guide plate 50 having a cylindrical shape (a hollow disc shape) has been described in the aforementioned embodiment. However, the light guide plate may be a plate-like member having a rectangular parallelepiped shape, and the multiple light emitting elements may be arranged so as to longitudinally face the light guide plate such that each of the optical axis directions of the light emitting elements matches the longitudinal direction of the light guide plate. More specifically, as exemplified by a light guide plate 250 of an illustration device 201 of a modification in FIG. 8, the light guide plate 250 may have a flat plate-like shape. Multiple LEDs 242 may be provided, on one side in the longitudinal direction (hereinafter, referred to as a direction) of the light guide plate 250, at an interval in the width direction (hereinafter, referred to as β direction) such that the optical axis direction matches the a direction. Alternatively, the optical axis direction may match the separating direction which is a direction away from the LEDs 242. Multiple optical structures 271 formed of dot-like projections may be provided on one surface (rear side surface) in the thickness direction (hereinafter, referred to as γ direction) of the light guide plate 250.

The multiple optical structures 271 may include a first arrangement section 272, a second arrangement section 273, and a third arrangement section 274. The first arrangement section 272 may be formed of multiple optical structures 271a arranged in a first region A' on the LED 242 side in the a direction of the light guide plate 250. The second arrangement section 273 may be formed of multiple optical structures 271b arranged in a second region B' on the side away, in the a direction (the optical axis direction), from the LEDs 242 on the light guide plate 250. The third arrangement section 274 may be formed of multiple optical structures 271c arranged in a third region C' between the first region A' and the second region B' with respect to the a direction.

In the multiple optical structures 271a in the first region A', the interval between the optical structures 271a that are adjacent to each other in the optical axis direction may decrease in an arithmetic series manner with increase in the distance, in the optical axis direction, from the LEDs 42. In the multiple optical structures 271b in the second region B', the interval between the optical structures 271b that are adjacent to each other in the optical axis direction may be fixed irrespective of the distance, in the optical axis direction, from the LEDs 42. In the multiple optical structures 271c in the third region C', the interval between the optical structures 271c that are adjacent to each other in the optical axis direction may be smaller than the minimum interval between the optical structures 271a that are adjacent to each other in the optical axis direction in the first arrangement section 272. Also, in the multiple optical structures 271c in the third region C', the interval between the optical structures 271c that are adjacent to each other in the optical axis direction may be larger than the interval between the optical structures 271b that are adjacent to each other in the optical axis direction in the second arrangement section 273. In addition, in the multiple optical structures 271c in the third region C', the interval between the optical structures 271c that are adjacent to each other in the optical axis direction may decrease with increase in the distance, in the optical axis direction, from the LEDs 42.

Further, a two-dimensional plane is created in which the distance, in the optical axis direction, from the LEDs 242 is used as one parameter and the interval between the optical structures 271 that are adjacent to each other in the optical axis direction is used as the other parameter. The distances of the multiple optical structures 271, in the optical axis direction, from the LEDs 242 and the intervals between the adjacent optical structures 271, are plotted on the two-dimensional plane. Here, multiple points plotted on the two-dimensional plane may be able to be disposed on a smooth line which is differentiable. Among the multiple plotted points, multiple points related to the multiple optical structures 271c in the third region C' may be disposed on the same clothoid curve. The smooth line may be formed by connecting, in a differentiable manner, a straight line that decreases with increase of the distance, in the optical axis direction, from the LEDs 242, the clothoid curve, and a straight line on which the interval between the optical structures that are adjacent to each other in the optical axis direction is fixed. According to this modification, the technical concept of the present disclosure can be easily realized in an illumination device having a rectangular parallelepiped shape.

The case where the multiple points related to the multiple optical structures 71c in the third region C are disposed on the same clothoid curve y3, has been described above. However, a two-dimensional plane may be created in which the distance, in the optical axis direction, from the LEDs is used as one parameter and the interval between the optical structures that are adjacent to each other in the optical axis direction is used as the other parameter. The distances of the multiple optical structures, in the optical axis direction, from the LEDs and the intervals, at the distances, between the optical structures that are adjacent to each other in the optical axis direction may be plotted on the two-dimensional plane. Here, multiple points plotted on the two-dimensional plane may be able to be disposed on a smooth line which is differentiable. Among the multiple plotted points, multiple points related to the multiple optical structures in the third region may be disposed on a curved line formed of a part of the same secondary curved line (a circle, an ellipse, a parabola, or a hyperbola). Also in the present modification, the line indicating the interval between the optical structures 271 can be differentiable in the third arrangement section 274 and the connection region of the first and second arrangement sections 272, 273, as in the embodiment using the clothoid curve y3. The line indicating the interval between the optical structures 271 can easily decrease with increase in the distance from the LEDs 242 in the third arrangement section 274. Regarding the optical structures belonging to the third arrangement section, it has been assumed that the distances, in the separating direction, from the light emitting elements and the intervals, at the distances in the separating direction, between the adjacent optical structures, are plotted on the two-dimensional plane. The cases where multiple points are plotted on the two-dimensional plane and the multiple points are disposed on the same clothoid curve or are positioned on the same secondary curve have been described. However, another modification of the case where, regarding the optical structures belonging to the third arrangement section, the distances, in the separating direction, from the light emitting elements and the intervals between the optical structures that are adjacent to each other at the distances in the separating direction, are plotted on a two-dimensional plane, can be made. For example, multiple points may be plotted on the two-dimensional plane and the multiple points may be disposed on a curved line formed of a part of the same three-order or higher curved line. That is, it is sufficient that, in the third arrangement section, the interval between the adjacent optical structures with respect to the direction away from the light emitting elements is smaller than the minimum interval between the adjacent optical structures in the first arrangement section, is larger than the interval between the adjacent optical structures in the second arrangement section, and decreases with increase in the distance from the light emitting elements.

Cases where the optical structures 71, 171, 271 are dot-like projections have been described above. The dot-like projections preferably have hemispherical shapes or semielliptical shapes, but may any other projecting shapes. Also, the case where all the dot-like projections are identical to one another has been described above. However, the diameter of a hemisphere circumscribing the dot-like projections may be increased with increase in the distance from the light emitting elements so that the covering rate increases with increase in the distance from the light emitting elements. Alternatively, each of the optical structures may have a structure other than a dot-like projection. For example, the optical structures may be formed of dot-like recesses. Alternatively, the optical structures may be formed of ridge-like projecting portions or grooves. More specifically, when the light guide plate has a cylindrical shape, the optical structures may be formed of multiple ridge-like projecting portions on a circle concentrically with the light guide plate or multiple grooves on a circle concentrically with the light guide plate. In this case, all the ridge-like projecting portions on a circle or all the grooves on a circle may have the same width, or the ridge-like projecting portions or the grooves may have two or more different widths. Alternatively, when the light guide plate has a rectangular parallelepiped shape, the optical structures may be formed of multiple linear ridge-like projecting portions or linear grooves extending in a direction orthogonal to the optical axis direction. In this case, all the linear ridge-like projecting portions or linear grooves may have the same width, or the linear ridge-like projecting portions or linear grooves may have two different widths.

The case where the light emitting elements are the LEDs 42 which are each formed by covering an LED chip with a sealing resin, has been described above. However, the light emitting elements may be formed of elements other than LEDs. For example, the light emitting elements may be formed of semiconductor laser elements, for example. Also, the case where the multiple LEDs 42 are arranged in one row in the thickness direction of the light guide plate 50, 250, has been described above. However, the multiple light emitting elements may be arranged in two or more rows in the thickness direction of the light guide plate.

The case where the entirety of the light guide plate 50 is formed into a plate-like shape and the optical axis directions of the LEDs 42 each match the separating direction which is a direction away from the LED 42 has been described above. However, the separating direction which is a direction away from the light emitting elements may not be a straight optical axis direction but include a direction along a curved line which is curved in at least a partial region, as in the technology adopted in AIR PANEL LEDs (registered trademark). Further, the light guide plate may not have a completely plate-like shape and may include a non plate-like portion.

The case where the multiple points which are related to the distances of the multiple optical structures 71 from the LEDs and the intervals between the optical structures that are adjacent to each other in the optical axis direction and which are plotted on the two-dimensional plane are disposed on the line which is differentiable, has been described above. However, multiple points which are related to the distances of the multiple optical structures from the light emitting elements and the intervals between the optical structures that are adjacent to each other in the optical axis direction and which are plotted on the two-dimensional plane may be disposed on a line which is non-differentiable. Also, the case where, on the two-dimensional plane regarding the distance of the multiple optical structures 71 from the LEDs and the covering rate of the multiple optical structures 71, the curved line indicating the covering rate has an inflection point in a region corresponding to the third arrangement section 74, has been described above. However, on the two-dimensional plane regarding the distance from the light emitting elements and the covering rate, the curved line indicating the covering rate may not have an inflection point in the region corresponding to the third arrangement section. Also, the case where when the light guide plate 50 has a cylindrical shape, the LEDs 42 are arranged on the inner circumferential side of the light guide plate 50, has been described above. However, when the light guide plate has a cylindrical shape, the light emitting elements may be arranged on the outer circumferential side of the light guide plate. In addition, the light guide plate may have a shape other than a cylindrical shape or a rectangular parallelepiped shape.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

What is claimed is:

1. An illumination device, comprising:
a mounting substrate on which multiple light emitting elements are mounted;
a light guide plate that receives and guides at least a part of emission light emitted from the multiple light emitting elements and at least a part of which has a plate-like portion; and
multiple optical structures that are provided at intervals on at least a part of one surface of the plate-like portion and which change a traveling direction of light,
wherein the multiple optical structures include
a first arrangement section that is provided on the light emitting element side and in which an interval between the adjacent optical structures decreases in an arithmetic series manner with increase in a distance from the light emitting elements,
a second arrangement section that is provided on a side away from the light emitting elements and in which the interval between the optical structures that are adjacent to each other in a separating direction is fixed, the separating direction being a direction away from the light emitting elements, and
a third arrangement section that is provided between the first arrangement section and the second arrangement section with respect to the separating direction and in which the interval between the adjacent optical structures is smaller than a minimum interval between the adjacent optical structures in the first arrangement section, is larger than the interval between the adjacent optical structures in the second arrangement section, and decreases with increase in the distance from the light emitting elements.

2. The illumination device according to claim 1,
wherein when distances, in the separating direction, of the multiple optical structures from the light emitting elements, and intervals between the optical structures that are adjacent to each other in the separating direction, are plotted on a two-dimensional plane in which the distance, in the separating direction, from the light emitting elements is used as one parameter and the interval between the optical structures that are adjacent to each other in the separating direction is used as another parameter, multiple points plotted on the two-dimensional plane can be disposed on a smooth line that is differentiable and that decreases with an increase in the distance from the light emitting elements.

3. The illumination device according to claim 1,
wherein the multiple optical structures each have a same circular edge,
a covering rate is defined as a ratio of a presence region of the optical structures to a surface on which the optical structures are arranged in a plan view, and
when, the intervals between the optical structures that are adjacent to each other in the separating direction and covering rates, at the distances in the separating direction from the light emitting elements, are plotted on a two-dimensional plane in which the distance, in the separating direction, from the light emitting elements is used as one parameter and the covering rate is used as another parameter, multiple points plotted on the two-dimensional plane can be disposed on a smooth line that is differentiable and on which the covering rate increases with an increase in the distance, and
the smooth line has an inflection point in a region corresponding to the third arrangement section.

4. The illumination device according to claim 1,
wherein the light guide plate has a cylindrical shape,
the multiple light emitting elements are arranged in one or more rows in an axis direction of the light guide plate, and
two or more of the light emitting elements arranged in the same row are provided at an interval in a circumferential direction of the light guide plate, while each of optical axes of the light emitting elements matches the radial direction of the light guide plate.

5. The illumination device according to claim 1,
wherein the light guide plate has a rectangular parallelepiped shape, and
the multiple light emitting elements are arranged so as to longitudinally face the light guide plate, while each of optical axes of the multiple light emitting elements matches the longitudinal direction of the light guide plate.

6. The illumination device according to claim 1,
wherein the separating direction is along a curved line that is curved in at least a partial region.

7. The illumination device according to claim 2,
wherein in the optical structures belonging to the third arrangement section, when distances, in the separating direction, from the light emitting elements and intervals, between the optical structures that are adjacent to each other in the separating direction are plotted on the two-dimensional plane, multiple points plotted on the two-dimensional plane are disposed on a same clothoid curve.

8. The illumination device according to claim 2,
wherein in the optical structures belonging to the third arrangement section, when distances, in the separating direction, from the light emitting elements and intervals, between the optical structures that are adjacent to each other in the separating direction are plotted on the two-dimensional plane, multiple points plotted on the two-dimensional plane are disposed on the same secondary curve.

* * * * *